United States Patent
Schubert

(10) Patent No.: US 10,871,189 B2
(45) Date of Patent: Dec. 22, 2020

(54) PLAIN BEARING COMPOSITE MATERIAL HAVING A METALLIC SUPPORT LAYER AND A METALLIC BEARING METAL LAYER

(71) Applicant: KS GLEITLAGER GMBH, St. Leon-Rot (DE)

(72) Inventor: Werner Schubert, Wiesloch (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 16/491,072

(22) PCT Filed: Jan. 24, 2018

(86) PCT No.: PCT/EP2018/051658
§ 371 (c)(1),
(2) Date: Sep. 4, 2019

(87) PCT Pub. No.: WO2018/166681
PCT Pub. Date: Sep. 20, 2018

(65) Prior Publication Data
US 2020/0011377 A1 Jan. 9, 2020

(30) Foreign Application Priority Data
Mar. 16, 2017 (DE) .................. 10 2017 105 602

(51) Int. Cl.
*F16C 33/12* (2006.01)
*F16C 33/14* (2006.01)
*F16C 33/24* (2006.01)
(52) U.S. Cl.
CPC .......... *F16C 33/128* (2013.01); *F16C 33/145* (2013.01); *F16C 33/24* (2013.01); *F16C 2240/48* (2013.01)

(58) Field of Classification Search
CPC ........ C22C 9/02; F16C 33/128; F16C 33/145; F16C 33/24; F16C 2204/12; F16C 2360/22
See application file for complete search history.

(56) References Cited

U.S. PATENT DOCUMENTS 8,679,641 B2 * 3/2014 Saxton ...................... B22F 7/08
 419/10
8,703,660 B2 * 4/2014 Schmitt ............... C22C 32/0068
 508/103

(Continued)

FOREIGN PATENT DOCUMENTS

CN 101201081 A 6/2008
DE 102004008630 A1 9/2005

(Continued)

OTHER PUBLICATIONS

German Examination Report dated Nov. 22, 2017.

(Continued)

*Primary Examiner* — Phillip A Johnson
(74) *Attorney, Agent, or Firm* — Dilworth & Barrese, LLP

(57) ABSTRACT

The invention relates to a plain bearing composite material (2) having a metallic support layer (4) and a metallic bearing metal layer (6), wherein the bearing metal layer (6) is a sinter layer (10) made of a copper/tin-based bronze powder (8), wherein the bronze powder (8) comprises a metallic solid lubricant (12) which is not soluble or barely soluble in copper, such as bismuth in particular, and is applied to the support layer (4) in a pulverulent state and then sintered onto the support layer (4); according to the invention, it is proposed that the bronze powder (8) is formed from powder fractions having different proportions of this solid lubricant (12), wherein the solid lubricant proportion of a first powder (Continued)

Figure 2:
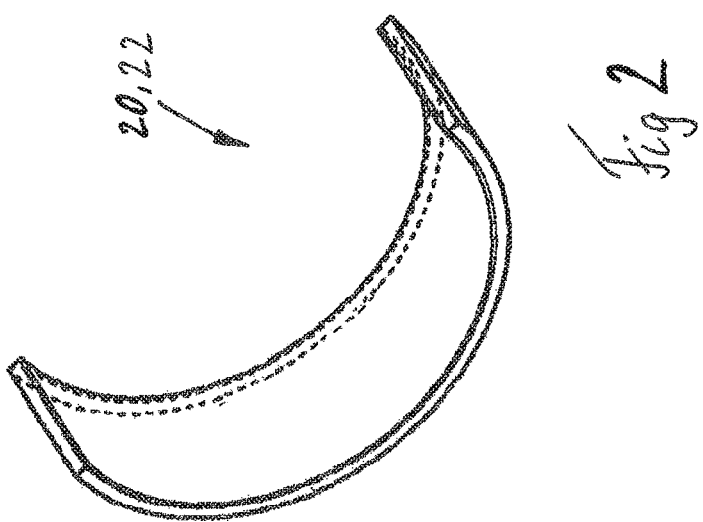

fraction is greater than the solid lubricant proportion of a second powder fraction at least by a factor of 2.

20 Claims, 1 Drawing Sheet

(56) References Cited

U.S. PATENT DOCUMENTS

| | | | |
|---|---|---|---|
| 9,074,629 B2 * | 7/2015 | Yamauchi | ............... F16C 33/24 |
| 9,468,974 B2 * | 10/2016 | Schmitt | ................... B22F 7/08 |
| 2008/0159671 A1 | 7/2008 | Leonardelli | |
| 2014/0363570 A1 * | 12/2014 | Schmitt | ................... B05D 5/08 |
| | | | 427/203 |

FOREIGN PATENT DOCUMENTS

| | | |
|---|---|---|
| DE | 102007033902 B3 | 12/2008 |
| EP | 1716343 B1 | 2/2005 |
| JP | S6058841 A | 4/1985 |
| WO | 20050808811 A1 | 9/2005 |

OTHER PUBLICATIONS

German Examination Report dated Dec. 12, 2017.
German-language Written Opinion and English-Translation of International Search Report from PCT/EP2018/051658 dated May 8, 2018.
1st Chinese Office Action from Chinese Patent Application 201880017959.2 dated Jul. 3, 2020.

* cited by examiner

PLAIN BEARING COMPOSITE MATERIAL HAVING A METALLIC SUPPORT LAYER AND A METALLIC BEARING METAL LAYER

This application claims priority to German Patent Application No. 102017105602.5 filed on Mar. 16, 2017, the contents of which are incorporated by reference herein in their entirety.

The invention relates to a plain bearing composite material having a metallic support layer and a metallic bearing metal layer, wherein the bearing metal layer is a sinter layer made of a copper/tin-based bronze powder, wherein the bronze powder comprises a metallic solid lubricant which is not soluble or barely soluble in copper, such as bismuth in particular, and is applied to the support layer in a pulverulent state and then sintered onto the support layer.

Plain bearing composite materials of the aforementioned type are known.

The object of the present invention is to improve the load capacity and wear resistance of the plain bearing composite material.

Said object is achieved by means of the bronze power being formed from powder fractions having different proportions of this solid lubricant, wherein the solid lubricant proportion of a first powder fraction is greater than the solid lubricant proportion of a second powder fraction at least by a factor of 2.

The applicant has determined that the solid lubricant contained in the copper/tin-based bronze powder may prove problematic in terms of forming a strong cohesion of the metal particles forming the bearing metal layer insofar as the solid lubricant at least partially exudes from the bronze particles during the sintering process. It collects on the surfaces thereof and also tends to fill the interstices between the particles. However, since the solid lubricant also coats the surface of the bronze particles, the solid lubricant makes it difficult to sinter the individual bronze particles together. It is therefore capable of impairing a strong and three-dimensionally dense materially bonded connection of the bronze particles, which in turn has impacts on and impairs the wear resistance and load capacity of the plain bearing composite material.

The applicant has determined that the sinterability of the bronze particles can be significantly improved as a result of the inventive measure of using powder fractions having different proportions of the solid lubricant. On the surface of the particles of the second powder fraction, where the solid lubricant content is significantly lower than in the first particle fraction and which preferably has a very low solid lubricant proportion or can preferably be designed to be free of lubricant, the surface of the particles is much less coated by the solid lubricant, with the result that the sintering bond as a whole, i.e. the cohesive connection of the particles with each other, is improved, which in turn has a positive effect on the wear resistance and load capacity of the plain bearing composite material. It is therefore proposed that the solid lubricant proportion of the first powder fraction be greater than the solid lubricant proportion of the second powder fraction at least by a factor of 4, in particular at least by a factor of 6, more particularly at least by a factor of 10. The second powder fraction is preferably free of solid lubricant.

In the plain bearing composite material according to the invention, locally varying compositions of the bearing metal layer then result at certain scales in the bronze particles. It has been determined that improved particle compatibility and adaptability during operation is achieved thereby, which in turn has a positive effect with respect to a greater load capacity because foreign particles are more able to be absorbed locally.

In the context of the invention, it is also conceivable for the bronze powder to comprise yet further powder fractions, in which case it is considered to be advantageous for the bronze powder to consist of the first and the second powder fractions.

As previously indicated, the metallic lubricant which is not soluble or barely soluble in copper is preferably bismuth. Due to the insolubility of bismuth in copper and due to the very high sintering temperature and mobility within the copper matrix associated therewith, bismuth forms local phases and precipitates. However, as mentioned, it also tends to exude with respect to the bronze particles, which has a disadvantageous influence on the sinterability of the particles determined by the applicant. However, this influence is addressed by the inventive use of powder fractions having different bismuth proportions.

In a refinement of the invention, it is proposed that the powder fractions also have a different tin content. It proves to be advantageous in this case for the first powder fraction, which has the high solid lubricant proportion, to also have a greater tin content than the second powder fraction. In one respect, the reason for doing so is the fact that an increasing tin content is associated with a decreasing sintering temperature. The sintering process is indeed performed at the higher sintering temperature of both powder fractions, but this approach then provides a qualitatively improved result for the sinter bridges being formed in the other powder fraction having higher tin and solid lubricant proportions. Nevertheless, a higher tin content also means that the particle in question will be harder. If said particle also has a higher proportion of solid lubricant, then this harder particle will also be surrounded by more solid lubricant after the solid lubricant has exuded, which proves to be advantageous in a tribological sense.

It is further proposed that a first powder fraction has a tin content of 8 to 11 wt %, and a second powder fraction has a tin content of 3 to 8 wt %, in particular 3 to 6 wt %.

It proves to be further advantageous for a first powder fraction to have a bismuth content of 4 to 20 wt %, in particular 6 to 16 wt %, more particularly 8 to 12 wt %, and a second powder fraction to have a bismuth content of up to 2 wt %, in particular up to 1 wt %, and further particularly up to 0.1 wt %. The second powder fraction is preferably free of solid lubricant and is, therefore, also free of bismuth.

It proves to be further advantageous for a first powder fraction to be made of a CuSn(8-12)Bi(6-10) alloy, in particular a CuSn(9-11)Bi(7-9) alloy, more particularly a CuSn(10)Bi(8) alloy, and a second powder fraction to be made of a CuSn(4-6) alloy, in particular a CuSn(5) alloy, wherein the alloys may optionally comprise 0.5-5 wt % zinc, in particular 0.5-4 wt % zinc, more particularly 0.5-3 wt % zinc, further optionally 0.5-6 wt % nickel, in particular 0.5-5 wt % nickel, more particularly 0.5-4 wt % nickel, further particularly 0.5-3 wt % nickel, and further optionally 0.1-1 wt % silver, in particular 0.1-0.5 wt % silver. A CuSn(10)Bi(8)Zn(3) alloy is preferable for the first powder fraction, and a CuSn(5)Zn(1) alloy or a CuSn(4.5)Zn(0.8)Ni(0.6)Ag(0.4) alloy is preferable for the second powder fraction.

The object of the invention is also a method for producing a plain bearing composite material having the features of claim 10. Therefore, the two powder fractions are accordingly prepared and completely, i.e. homogeneously, mixed together and then scattered onto the metallic support layer before being sintered together. In this case, the processes for sintering the powders onto the layer or together may comprise a presintering process followed by a densification process and then a post-sintering process followed by a rolling process.

It proves to be advantageous for the bearing metal layer to be densified in a way that essentially no open pores remain between the particles of the bronze powder that have been sintered together. In a microsection, bismuth phases at most are discernible between the sintered and densified bronze particles. In particular, the porosity is less than 0.1%.

Furthermore, after the sintering process, in particular after the post-sintering process, more particularly before and/or after the rolling process, a heat treatment can be performed with the aim of adjusting the hardness of the metallic support layer and the bearing metal layer.

Further details, features, and advantages of the invention follow from the attached patent claims and from the graphic illustrations as well as the subsequent description of a plain bearing composite material according to the invention.

Figure 1:
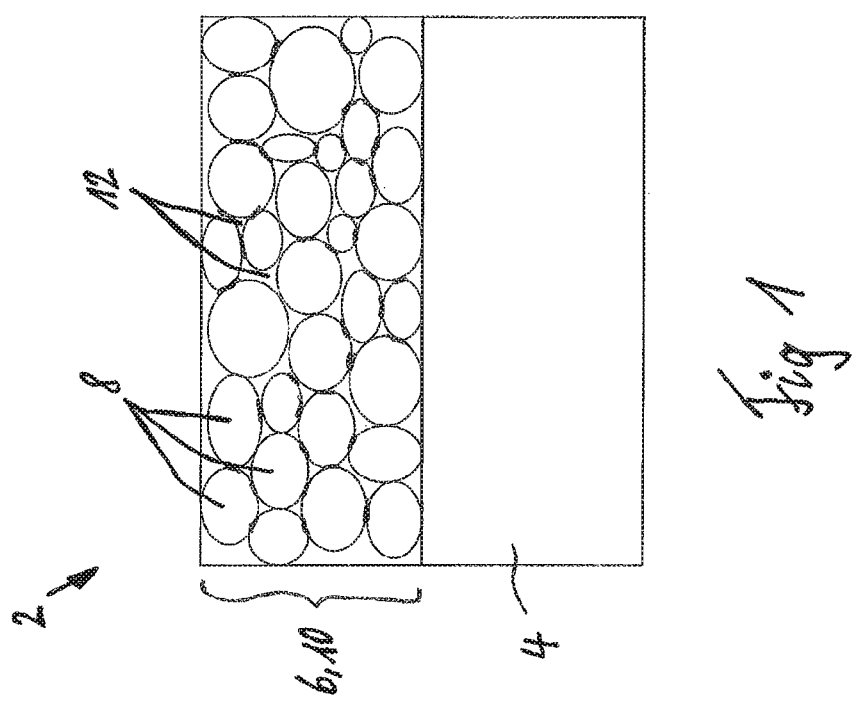

In the drawings:

FIG. 1 is a highly schematic sectional view of a plain bearing composite material according to the invention (after a sintering process, but before a densification process), and FIG. 2 is a schematic view of a plain bearing element of a plain bearing composite material according to the invention in the form of a plain bearing shell for mounting the crankshaft in an internal combustion engine.

The plain bearing composite material 2 according to the invention comprises a metallic support layer 4, in particular made of steel, and a metallic bearing metal layer 6 in the form of a sinter layer 10 made of a copper/tin-based bronze powder 8. The bronze powder 8 is applied in a pulverulent state onto the support layer 4 and sintered. The copper/tin-based bronze powder 8 further comprises a metallic solid lubricant which is not soluble or barely soluble in copper. In the course of the sintering process, part of this metallic solid lubricant exudes and accumulates in interstices 12 between the particles of the bronze powder 8, where it forms, in a manner of speaking, pockets of lubricant around the respective particle. FIG. 1 schematically illustrates the plain bearing composite material after the sintering of the bronze powder, but before a densification process. The composite material still exhibits porosity, i.e., open pores between the particles of the bronze powder 8. Preferably, the bearing metal layer 6 thus obtained is densified in one or more steps in a way that essentially no open pores remain between the particles of the bronze powder that have been sintered together. The bearing metal layer 6 is thus densely sintered.

According to the invention, the bronze powder 8 is, as previously described, formed from powder fractions having different proportions of the metallic solid lubricant, preferably in the form of bismuth. An improved sintered composite is achieved thereby.

FIG. 2 shows a plain bearing element 20 in the form of a bearing shell 22 which was produced in a bending/rolling process from a section of the plain bearing composite material 2 according to the invention.

The invention claimed is:

1. A plain bearing composite material (2) having a metallic support layer (4) and a metallic bearing metal layer (6), wherein the metallic bearing metal layer (6) is a sinter layer (10) made of a copper/tin-based bronze powder composition (8), wherein the copper/tin-based bronze powder composition (8) comprises a metallic solid lubricant, which metallic solid lubricant is not soluble in copper, and
wherein the copper/tin-based bronze powder composition (8) has been applied to the support layer (4) in a pulverulent state and then sintered onto the support layer (4), and,
wherein the copper/tin-based bronze powder composition (8) comprises a first copper/tin-based bronze powder and a second copper/tin-based bronze powder, and wherein a proportion of metallic solid lubricant in the first powder is greater than a proportion of metallic solid lubricant in the second powder by a factor of at least 2.

2. The plain bearing composite material of claim 1, wherein the second powder is free of lubricant.

3. The plain bearing composite material of claim 1 wherein the proportion of solid lubricant in the first powder is greater than the proportion of solid lubricant in the second powder by a factor of at least 4.

4. The plain bearing composite material of claim 1, wherein the metallic solid lubricant is bismuth.

5. The plain bearing composite material of claim 1, wherein the first and second powders each have a different tin content.

6. The plain bearing composite material of claim 5, wherein the first powder has a greater tin content than the second powder.

7. The plain bearing composite material of claim 5 wherein the first powder has a tin content of 8 to 11 wt %, and the second powder has a tin content of 3 to 8 wt %.

8. The plain bearing composite material of claim 1, wherein the metallic solid lubricant is bismuth and the first powder has a bismuth content of 4 to 20 wt %, and the second powder has a bismuth content of up to 2 wt %.

9. The plain bearing composite material of claim 1, wherein the first powder is made of a CuSn(8-12)Bi(6-10) alloy, and the second powder is made of a CuSn(4-6) alloy.

10. A method for producing the plain bearing composite material (2) of claim 1, comprising:
mixing the first and second powders to provide the copper/tin-based bronze powder composition (8)
scattering the copper/tin-based bronze powder composition (8) onto a support strip which forms the metallic support layer (4), and
sintering the copper/tin-based bronze powder composition (8) onto the metallic support layer (4).

11. The method according to claim 10, wherein the sintering comprises a pre-sintering process followed by a densification process and then a post-sintering process followed by a rolling process.

12. The method according to claim 10 wherein the sintering step produces the metallic bearing metal layer densified in a way such that essentially no open pores remain between the particles of the bronze powder that have been sintered together.

13. The method of claim 10 wherein after the sintering process, a heat treatment process is performed.

14. The method according to claim 10 wherein blank sections are separated from the support strip transversely to the longitudinal direction thereof before said blank sections are formed in a bending/rolling process.

15. The method according to claim 10 wherein the second powder is free of lubricant.

16. The method of claim 10 wherein the first powder has a greater tin content than the second powder.

17. The method according to claim 10 wherein the first powder has a tin content of 8 to 11 wt %, and the second powder has a tin content of 3 to 8 wt %.

18. The method according to claim 10, wherein the metallic solid lubricant is bismuth and the first powder has a bismuth content of 4 to 20 wt %, and the second powder has a bismuth content of up to 2 wt %.

19. The method according to claim 10, wherein the first powder is made of a CuSn(8-12)Bi(6-10) alloy, and the second powder is made of a CuSn(4-6) alloy.

20. A plain bearing element (20), for supporting crankshafts in internal combustion engines, produced from the plain bearing composite material of claim 1.

* * * * *